United States Patent [19]
Schipper

[11] Patent Number: 6,002,361
[45] Date of Patent: Dec. 14, 1999

[54] DIRECT INTEGRATED APPROACH TO MULTIPATH SIGNAL IDENTIFICATION

[75] Inventor: John F. Schipper, Palo Alto, Calif.

[73] Assignee: Trimble Navigation Limited, Mountain View, Calif.

[21] Appl. No.: 08/822,827

[22] Filed: Mar. 24, 1997

Related U.S. Application Data

[63] Continuation of application No. 08/640,449, Apr. 30, 1996.

[51] Int. Cl.$^6$ ..................................... G01S 5/02
[52] U.S. Cl. .................. 342/357; 342/453; 342/463; 375/343; 375/347; 375/349
[58] Field of Search ................... 342/463, 453, 342/357; 375/208, 209, 210, 343, 347, 349

[56] References Cited

U.S. PATENT DOCUMENTS

| | | | |
|---|---|---|---|
| 4,007,330 | 2/1977 | Winters | 178/88 |
| 4,168,529 | 9/1979 | Tomlinson | 364/728 |
| 4,203,070 | 5/1980 | Bowles et al. | 375/1 |
| 4,203,071 | 5/1980 | Bowles et al. | 375/1 |
| 4,550,414 | 10/1985 | Guinon et al. | 375/1 |
| 4,608,569 | 8/1986 | Dickey, Jr. et al. | 343/384 |
| 4,660,164 | 4/1987 | Leibowitz | 364/728 |
| 4,829,543 | 5/1989 | Borth et al. | 375/83 |
| 4,862,478 | 8/1989 | McIntosh | 375/1 |
| 5,091,918 | 2/1992 | Wales | 375/11 |
| 5,101,416 | 3/1992 | Fenton et al. | 375/1 |
| 5,164,959 | 11/1992 | Cai et al. | 375/1 |
| 5,282,228 | 1/1994 | Scott et al. | 375/97 |
| 5,347,536 | 9/1994 | Meehan | 375/1 |
| 5,390,207 | 2/1995 | Fenton et al. | 375/1 |
| 5,402,450 | 3/1995 | Lennen | 375/343 |
| 5,414,729 | 5/1995 | Fenton | 375/209 |
| 5,444,451 | 8/1995 | Johnson et al. | 342/453 |
| 5,481,503 | 1/1996 | Kuhn et al. | 367/100 |
| 5,488,662 | 1/1996 | Fox et al. | 380/34 |
| 5,493,588 | 2/1996 | Lennen | 375/343 |
| 5,495,499 | 2/1996 | Fenton | 375/205 |
| 5,524,023 | 6/1996 | Tsujumoto | 375/232 |

*Primary Examiner*—Thomas H. Tarcza
*Assistant Examiner*—Dap L. Phan
*Attorney, Agent, or Firm*—John F. Schipper

[57] ABSTRACT

Method and apparatus for improving the accuracy of a received composite signal s(t) that contains a known reference signal $S_d(t)$ with a known bit transition period $\Delta t_{chip}$ and that may contain a multipath signal $S_m(t;\chi;b)$ with an unknown multipath time delay b and an unknown multipath gain factor $\chi$ ($-1 \leq \chi \leq 1$). Autocorrelation functions $AC(\tau)$ and $AC(\tau;d)$ for the incoming signal and for the reference (direct) signal are determined, dependent upon a time shift variable $\tau$, and a double difference autocorrelation function $\Delta\Delta AC(\tau) = AC(\tau) - AC(\tau - \tau LE) - AC(\tau;d) + AC(\tau - \tau LE;d)$ is formed, where $\tau LE$ is a selected time shift displacement satisfying $0 < \tau LE \leq \Delta \tau_{chip}$. Two integrals or sums of $\Delta\Delta AC(\tau)$ are measured over different selected time shift intervals. The ratio of these two integrals or sums provides a quadratic equation in the time delay variable b that is solved for b. The gain factor $\chi$ is obtained from a ratio of integrals or sums of another ratio involving $\Delta\Delta AC(\tau)$. A multipath signal, if present, is approximated by $S_m(t;\chi;b) \approx \chi S_d(t-b)$ and can be removed from the incoming signal to provide an incoming signal with improved accuracy.

22 Claims, 18 Drawing Sheets

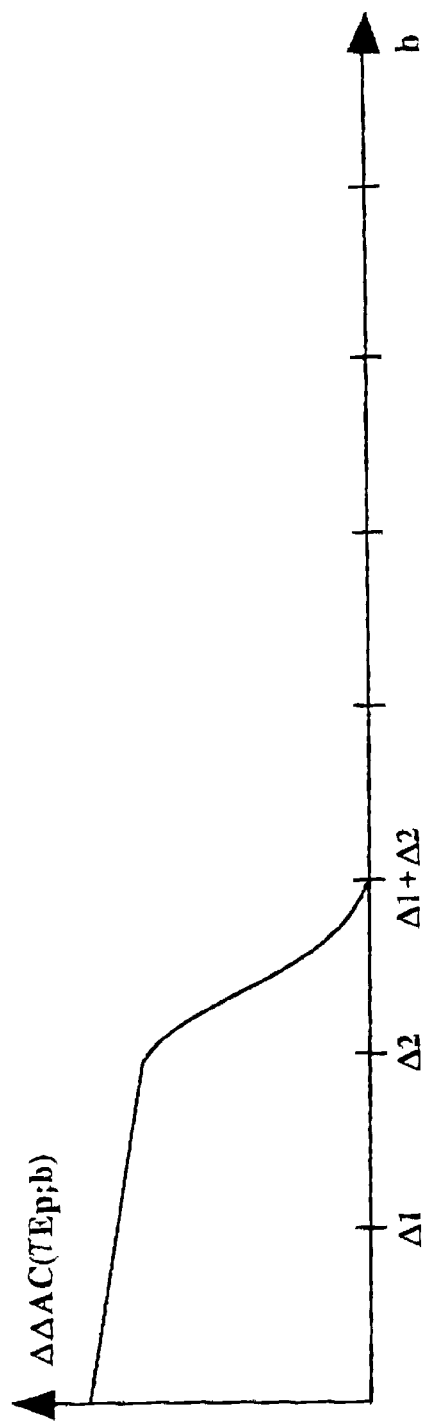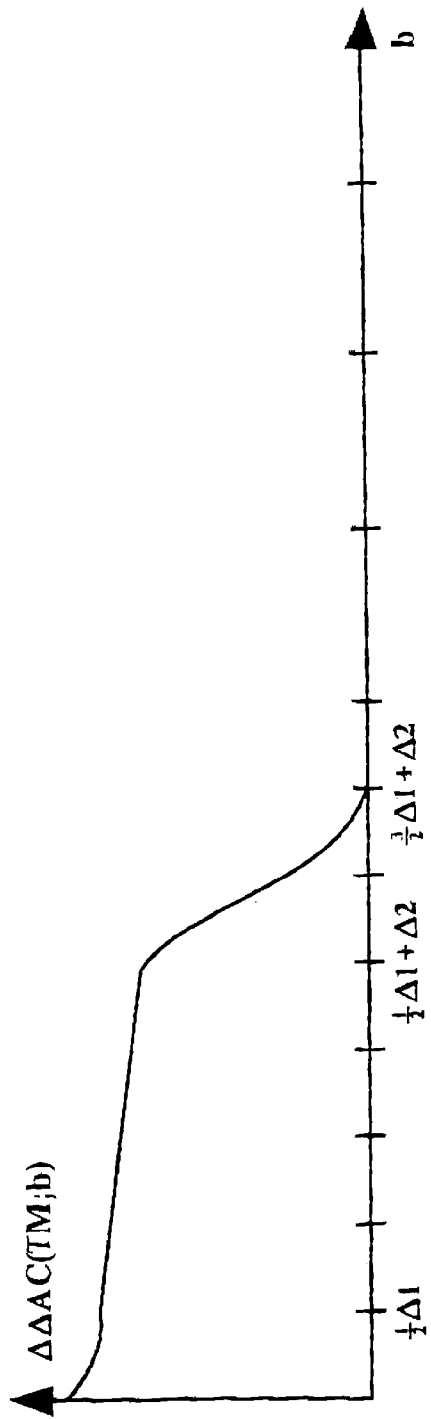

DIRECT INTEGRATED APPROACH TO MULTIPATH SIGNAL IDENTIFICATION

This application is a Continuation of U.S. Ser. No. 08/640,449, filed Apr. 30, 1996.

FIELD OF THE INVENTION

This invention relates to identification and removal of multipath signals from corrupted communication signals.

BACKGROUND OF THE INVENTION

The effects of multipath are well known in communication systems. Multipath is the term used to define the secondary signals that are locally induced reflections of a primary signal that enter the receiver in question a fraction of a second later than the direct path signal, and because of the relatively short time delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors, or at least much noisier data. In spread spectrum receivers, the effects of multipath are generally found in the correlators used to achieve signal timing synchronization. In location determination receivers, which seek to determine location based on triangulation of range distances determined from time delay measurements made from an orbiting constellation of satellites or other original sources, the effect of multipath is to induce comparatively large instantaneous errors in the time of arrival measurements, which translates into large errors in the indicated positions. Removal of these errors is the subject of most of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmissions is well known in the art. See R. E. Ziemer and R. L. Peterson, *Digital Communications and Spread Spectrum Systems*, Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying*, John Wiley & Sons, New York, Second Edition, 1995, and Ziemer and Peterson, op cit.

A GPS signal contains a 50 bit/second navigation message and a unique spreading code (C/A) of length 1,023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code.

Once the Doppler error in the downlink signal from the satellite is appropriately compensated for and signal synchronization is obtained, the navigation message in the 60 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Signal synchronization is performed using a signal correlator. The correlator constantly compares the incoming signal with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of auto correlation functions $AC(\tau)$ are shown in various texts, and an example is shown in FIG. 1A. An autocorrelation function $AC(\tau)$ is formed according to the prescription $$AC(\tau) = \int_0^T s(t')S_d(t' + \tau)dt', \text{ or} \qquad (1A)$$

$$AC(t) = \sum_{k=1}^K s(t_k)S_d(t_k + \tau), \qquad (1B)$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking the composite satellite signal requires maintaining signal synchronization. The peak of the autocorrelation function is rounded, not pointed, due to finite bandwidth effects, so that locating a true peak is difficult. Receiver designers have, therefore, resorted to an "early-minus-late" correlation tracking method, as discussed by W. M. Bowles in "Correlation Tracking," Charles Stark Draper Laboratory, May 1980, by Fenton et al in U.S. Pat. No. 5,101,416, and by Lennen in U.S. Pat. Nos. 5,402,450 and 5,493,588. In the early-minus-late tracking method, a first correlator measures an equivalent autocorrelation function when the local replica signal is shifted to an "early" time $t_E$ relative to the position ($\tau=t_P$) of an ideal or punctual replica, and a second correlator measures a second equivalent autocorrelation function when the local replica signal is shifted to a "late" time $t_L$. Early and late replicas of the punctual autocorrelation function $AC(\tau;P)$ (FIG. 2) are illustrated in FIG. 3. By subtracting the late autocorrelation function a correlation tracking function or autocorrelation difference function $\Delta AC(\tau)$ with a zero crossing, corresponding to the autocorrelation function peak can be developed, if the separations of the early and late time shifts from the punctual time shift are chosen to be equal. A representative early-minus-late tracking function $\Delta AC(\tau)$ is shown in FIG. 5.

If the tracking or time shift variable $\tau$ for the autocorrelation difference function $\Delta AC(\tau)$ lies to the left (to the right) of the zero crossing point, the system uses the presence of positive (negative) values of $\Delta AC(\tau)$ to increase (decrease) the value of $\tau$ and drive the system toward the zero crossing point for $\Delta AC(\tau)$. The zero-crossing point is thus easily measured and tracked, and the equivalent peak value and peak location for the autocorrelation function is easily determined. At the zero-crossing point on this doublet-like tracking function, maximum correlation occurs between the incoming signal and the local replica signal. The zero-crossing point represents a best estimate of time shift τ for signal synchronization. The internal clock time corresponding to the zero crossing point is a good estimate for time of arrival of an incoming signal at the receiver.

Superposition of an equivalent autocorrelation function for the multipath signal (reduced in magnitude and delayed in time) onto the autocorrelation function AC(τ) for the desired satellite code signal is a useful model for analyzing the effects of presence of multipath signals, as noted in the Fenton et al patents and in the Lennen patent, op. cit. Superposition of any additional signal onto the desired incoming signal, during the time period when signal correlation occurs, will distort the desired autocorrelation function AC(τ;direct) and produce an altered autocorrelation function AC(τ;composite) for the composite signal (direct plus multipath). An autocorrelation function for an uncorrupted or "pure" direct signal is shown along with a representative, attenuated and time delayed, multipath autocorrelation function for positive relative polarity, compared to the direct signal, in FIG. 3. The autocorrelation for the composite, corrupted incoming signal is obtained by summing the two autocorrelation functions, and is compared with the uncorrupted autocorrelation function. Similar graphs are obtained for a multipath signal with negative relative polarity, compared to the direct signal. Any such distortion produces errors in the indicated zero-crossing point on the early-minus-late correlation tracking function. These errors in indicated punctual time shift produce errors in the pseudo-range measurements, and will in turn produce an error in the final computed estimate of location coordinates for the receiver.

Another useful and equivalent model for analyzing the effect of presence of a multipath signal computes the autocorrelation functions AC(τ;x;d) and AC(τ;x;m) (x=E, L) for the pure direct signal (d) and the pure multipath signal (m), forms the early-minus-late difference functions ΔAC(τ;d) and ΔAC(τ;m) and adds these two difference functions to obtain the autocorrelation difference function ΔAC(τ;composite) for the composite signal.

Representative autocorrelation difference functions for a direct incoming signal and a composite incoming signal can be measured for positive relative multipath polarity and negative relative multipath polarity, respectively, compared to the direct signal. The tracking error due to presence of the multipath signal, obtained from the difference in zero crossing points for the direct signal and for the composite signal, is easily identified from a difference signal.

Previous work in the area of multipath amelioration has focused on two approaches: 1) estimating the effects and compensating for multipath-induced errors, and 2) attempting to limit the effects of the estimated multipath errors. In the Lennen patents, op. cit., both approaches are described. The estimation methods seek of model the distortions to the instantaneous autocorrelation function and to create a correction term to subtract from the indicated punctual time. Estimation methods are worthwhile but can never obtain perfection, wherein all multipath effects are removed, because the multipath signals are constantly varying and corrections can only be done after the fact.

A multipath limitation method, such as described in the Lennen Patents op. cit., operates the early-minus-late correlation tracking loop with a shorter delay between the early signal and late signal correlators than previous methods had employed. This limitation method reduces the effects of the presence of multipath substantially. In FIG. 3, the autocorrelation function AC(τ) and the corresponding tracking function ΔAC(τ) are shown for the case where the early-minus-late time delay is approximately 0.3 times the width $\Delta\tau_{chip}$ of a digital signal bit or chip.

Several workers have analyzed correlation functions and/or have used pseudo-random signal sequences in attempting to estimate or suppress the effects of the presence of multipath signals. Examples of these are Winters in U.S. Pat. No. 4,007,330, Tomlinson in U.S. Pat. No. 4,168,529, Bowles et al in U.S. Pat. Nos. 4,203,070 and 4,203,071, Guigon et al in U.S. Pat. No. 4,550,414, Dickey et al in U.S. Pat. No. 4,608,569, Liebowitz in U.S. Pat. No. 4,660,164, Borth et al in U.S. Pat. No. 4,829,543, McIntosh in U.S. Pat. No. 4,862,478, Wales in U.S. Pat. No. 5,091,918, Fenton et al in U.S. Pat. Nos. 5,101,416, 5,390,207, 5,414,729 and 5,495,499, Cai et al in U.S. Pat. No. 5,164,959, Scott et all In U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al in U.S. Pat. No. 5,481,503, and Fox et al in U.S. Pat. No. 5,488,662.

In many of these references, incoming signals are sampled, autocorrelation functions and difference functions are formed, and these functions are manipulated to produce modified functions in which the effects of presence of multipath signals are removed or suppressed. However, the particular parameters that identify or characterize a multipath signal usually cannot be determined using these approaches. What is needed is a more direct approach that allows identification of some of the parameters that characterize a multipath signal and that allows subsequent removal of multipath-like signals that are characterized by these parameters. Preferably, the method should provide quantitative estimates of the time delay, the gain magnitude and the relative polarity of an extant multipath signal, relative to the desired direct signal that would be manifest in the absence of multipath signals and other signal noise.

SUMMARY OF THE INVENTION

These needs are met by the invention, which provides a procedure (1) for obtaining quantitative estimates of parameters that characterize an extant multipath signal, and (2) for removing the effects of a multipath signal having these characteristics from an incoming signal. An incoming signal s(t), in digitized form with a digital period of $\Delta\tau_{chip}$, is mixed together with a selected, time-shifted reference signal $S_d(t+\tau)$, and an autocorrelation function AC(τ;P) is formed that is found to have a maximum amplitude at a time shift value τ=tP. Two time-shifted replicas, AC(τ;E) and AC(τ;L), of the function AC(τ;P) are formed at spaced apart time shifts τ=tE and τ=tL, satisfying the constraints tE≦tP≦tL (or tE<tP≦tL) and $Y_{LE}$=tL−tE<$\Delta\tau_{chip}$.

The incoming signal s(t) is assumed to be a composite signal including a sum of the direct signal $S_d(t)$, a multipath replica signal $S_m(t)=\chi\, S_d(t-b)$, and unbiased noise, designated as n(t), where the multipath gain χ and the multipath time delay b satisfy −1<χ<1 and b>0. The autocorrelation function AC(τ;x) (x=E, P, L) resulting from mixing the incoming signal and the reference or direct signal $S_d(t)$ is expressible as $$S_d(t+\tau)*s(t) = AC(t;P) \quad (2)$$
$$= \langle S_d(t+\tau)S_d(t)\rangle + \chi \langle S_d(t+\tau)S_d(t-b)\rangle + \langle S_d(t+\tau)n(t)\rangle$$
$$= AC(\tau;P;d) + \chi AC(\tau-b;P;d) + \varepsilon,$$

$$\varepsilon = \langle S_d(t+\tau)n(t)\rangle, \quad (3)$$

where <-> indicates an ensemble average or time average of the enclosed quantity, $AC(\tau;P;d)$ is the autocorrelation function that would be computed in the absence of multipath and noise (direct signal only), and the noise term e is small and is ignored for now. One task is to determine the parameters $\chi$ and b, using the computed autocorrelation function data.

Autocorrelation functions $\Delta AC(\tau)=AC(\tau;E)-AC(\tau;L)$ and $\Delta AC(\tau;d)=AC(\tau E;d)-AC(\tau L;d)$ for the incoming signal and for the direct signal are computed, and a double difference autocorrelation function $\Delta\Delta AC(\tau)=\Delta AC(\tau)-\Delta AC(\tau;d)=$ is formed and integrated or summed from a lower limit $\tau$ to each of two selected distinct upper limits $\tau1\hat{}$ and $\tau2\hat{}$. The ratio of these two integrals, when measured and when computed theoretically, yields a quadratic equation for the multipath signal time delay b in which $\chi$ does not appear. The gain factor $\chi$ is computed as a ratio of two other integrals. This approach directly yields an estimation of the time delay b and the gain factor $\chi$ for a multipath signal present in the incoming composite signal s(t).

BRIEF DESCRIPTION OF THE DRAWINGS

FIGS. 6A–6E are graphical views of integrals over the time shift variable $\tau$ of the total autocorrelation difference function for five selected integration ranges.

DESCRIPTION OF BEST MODES OF THE INVENTION

Figure 1:
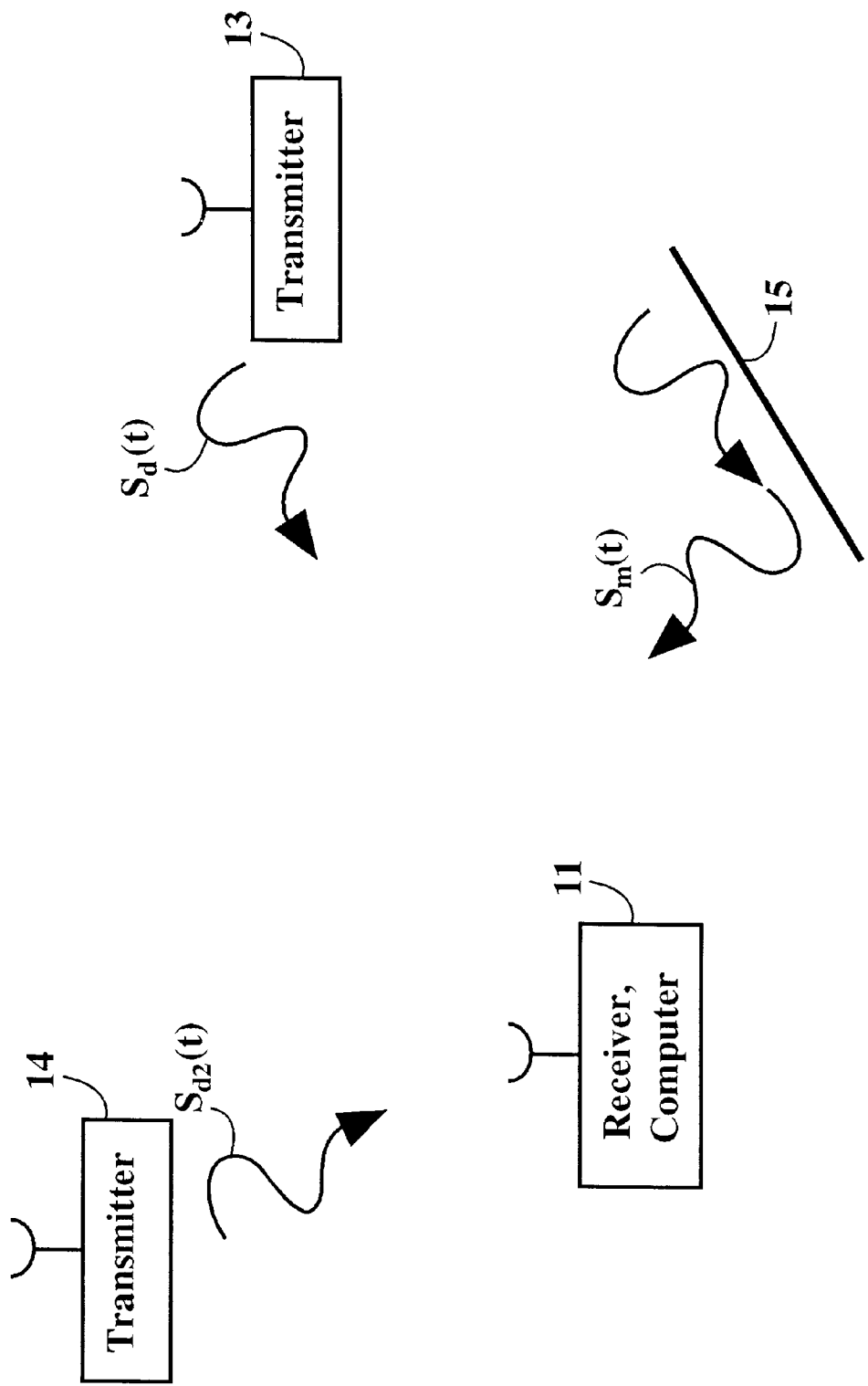
FIG. 1 illustrates an environment in which the invention can be used.

FIG. 1 illustrates a general environment in which the invention can be used. A receiver/computer 11 receives a spread spectrum digital signal transmitted by a transmitter 13. The received signal is a composite signal that includes a direct signal component $S_d(t)$ (the signal actually transmitted by the transmitter 13), a multipath signal component $S_m(t;\chi;b)$ that is an approximate replica of the direct signal component, but reflected from some signal-reflecting surface 15, and a noise component n(t). The multipath signal component $S_m(t;\chi;b)$ has a dimensionless gain factor of $\chi$ ($-1<\chi<1$) and arrives later than the direct signal component $S_d(t)$, after an as-yet-unknown time delay of b (sec). The multipath signal component is approximated as $$S_m(t;c;b)=\chi S_d(t-b), \quad (4)$$

where $\chi$ and b are to be determined.

Figure 2:
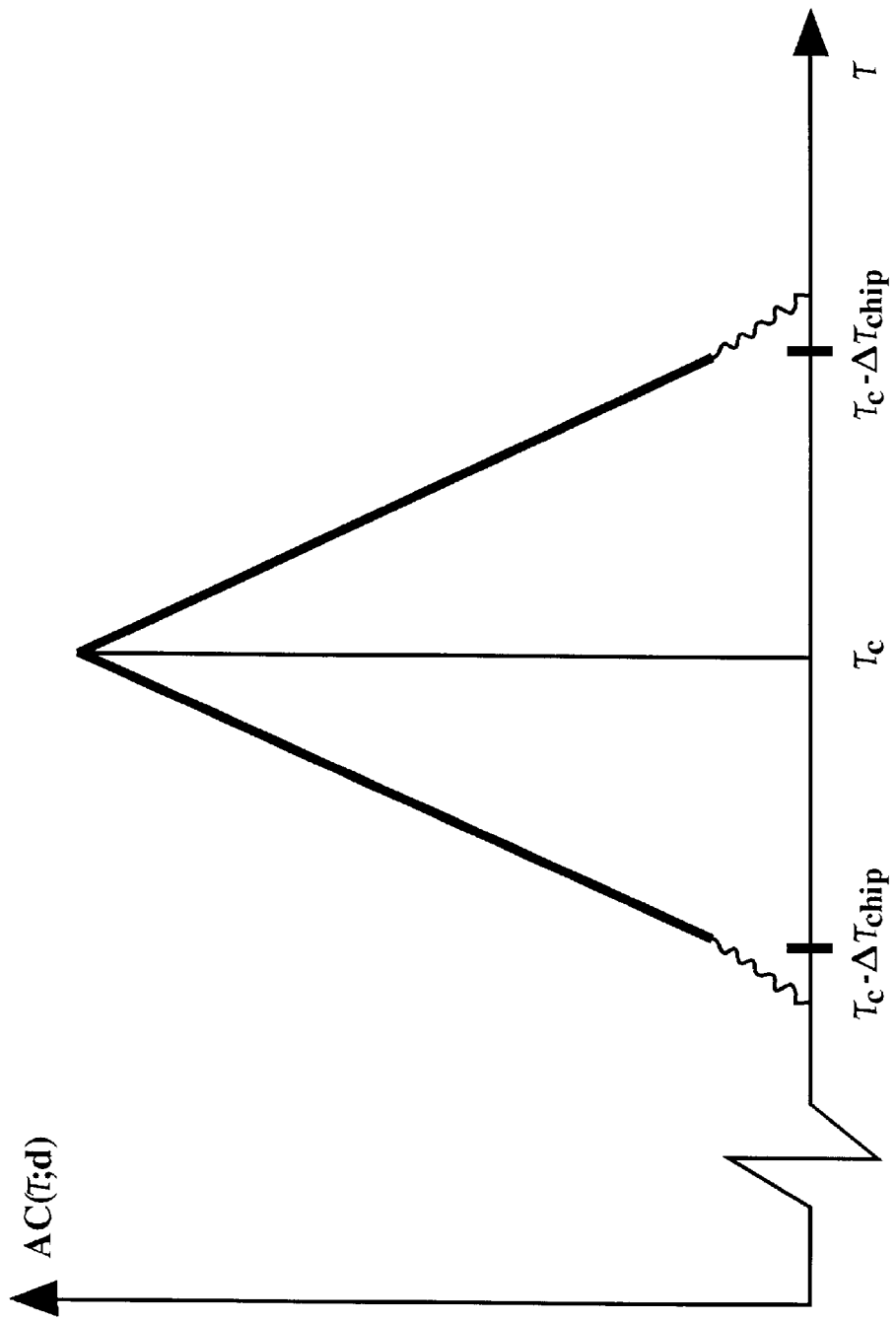
FIG. 2 is a graphical view of a representative autocorrelation function $AC(\tau;d;P)$ for a direct signal (only).

In an ideal situation, only the direct signal $S_d(t)$ would arrive, with no accompanying multipath signals and no noise. FIG. 2 illustrates a representative autocorrelation function $AC(\tau;d)$ formed as indicated in Eq. (1A) or (1B), that would be obtained by mixing the direct signal $S_d(t)$ (as a reference signal) and only the incoming direct signal component. Where the direct signal $S_d(t)$ is a digitized spread spectrum signal, the autocorrelation function $AC(\tau;d)$ will increase approximately linearly from a minimum value V(min) to a maximum value V(max) at a well-defined value $\tau=tP$ of the time shift variable, and will thereafter decrease approximately linearly to the minimum value V(min). Values of the autocorrelation function $AC(\tau;d)$ below V(min) are masked by the presence of multipath and non-multipath noise.

The autocorrelation function $AC(\tau;d)$ for the pristine direct signal $S_d(t)$ is assumed to be known here, either from laboratory testing and processing of the direct signal or from careful in situ monitoring of the signal received from the signal transmitter after the transmitter is placed in operation. The autocorrelation function $AC(\tau;d)$ is assumed to be representable as $$AC(\tau;d) = a(\tau-\tau E1) \quad (\tau E1 \le \tau \le \tau Ep) \quad (5)$$
$$= a(\tau E2 - \tau) \quad (\tau Ep \le \tau \le \tau E2)$$
$$= 0 \quad (\tau < \tau E1 \text{ or } \tau > \tau E2)$$

$$\tau Ep - \tau E1 = \Delta\tau_{chip}, \quad (6)$$

$$\tau E2 - \tau Ep = \Delta\tau_{chip}, \quad (7)$$

where the slope value "a" is known.

Figure 3:
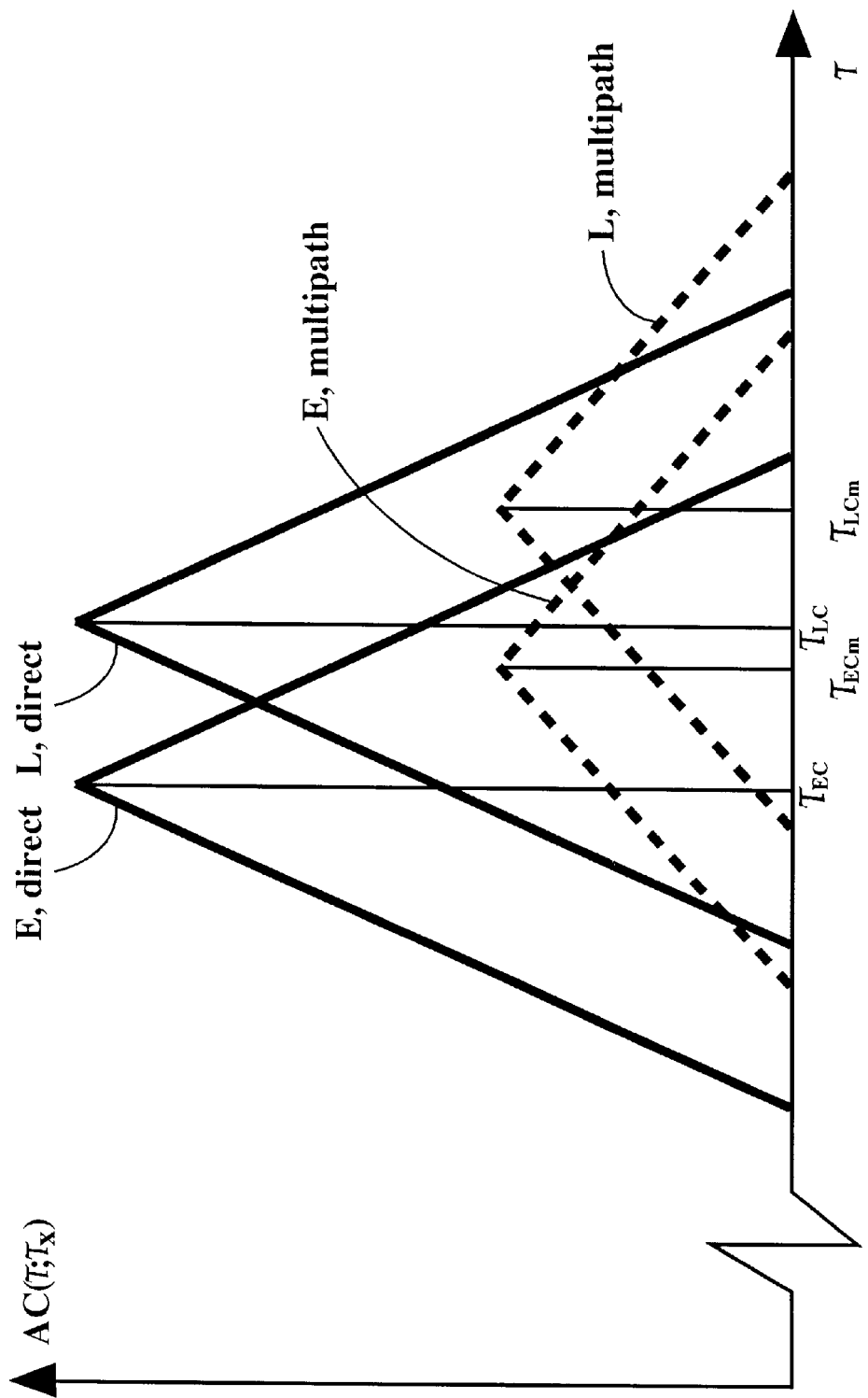
FIG. 3 is a graphical view of two autocorrelation signals $AC(\tau;d;\chi)$ (X=E,L) for a direct signal and of two autocorrelation signals $\chi AC(\tau-b;d;x)$ for a multipath signal that might accompany a direct signal as part of a composite incoming signal s(t).

FIG. 3 illustrates two autocorrelation functions $AC(t;d)$ and $AC(\tau-\tau LE;d)$ and another two autocorrelation functions $AC(\tau;m)$ and $AC(\tau-\tau_{LE};m)$, where the time shift variable $\tau$ is translated by a selected positive (or negative) amount $\Delta1=\tau_{LE}$ that has a small magnitude compared to $\Delta2=\Delta\tau_{chip}$. For purposes of illustration here, it is preferable that $$\Delta1 \le f\Delta2, (2/7 \le f \le 2/5) \quad (8)$$

although this requirement can be relaxed. If one forms the two autocorrelation difference functions $$\Delta AC(\tau;d)=AC(\tau;d)-AC(\tau-\tau_{LE};d), \quad (9)$$

$$\Delta AC(\tau;m)=AC(\tau;m)-AC(\tau-\tau_{LE};m), \quad (10)$$

the total autocorrelation difference function $\Delta AC(\tau;\chi;b)$ can be expressed as $$AC(\tau;\chi;b) = \quad (11)$$
$$AC(\tau;d) + AC(\tau;m) - AC(\tau-\tau_{LE};d) - AC(\tau-\tau_{LE};m)$$
$$= \Delta AC(\tau;d) + \Delta AC(\tau;m)$$

$$\Delta AC(\tau;m) = \chi AC(\tau-b;d) \quad (12)$$

Figure 4A:
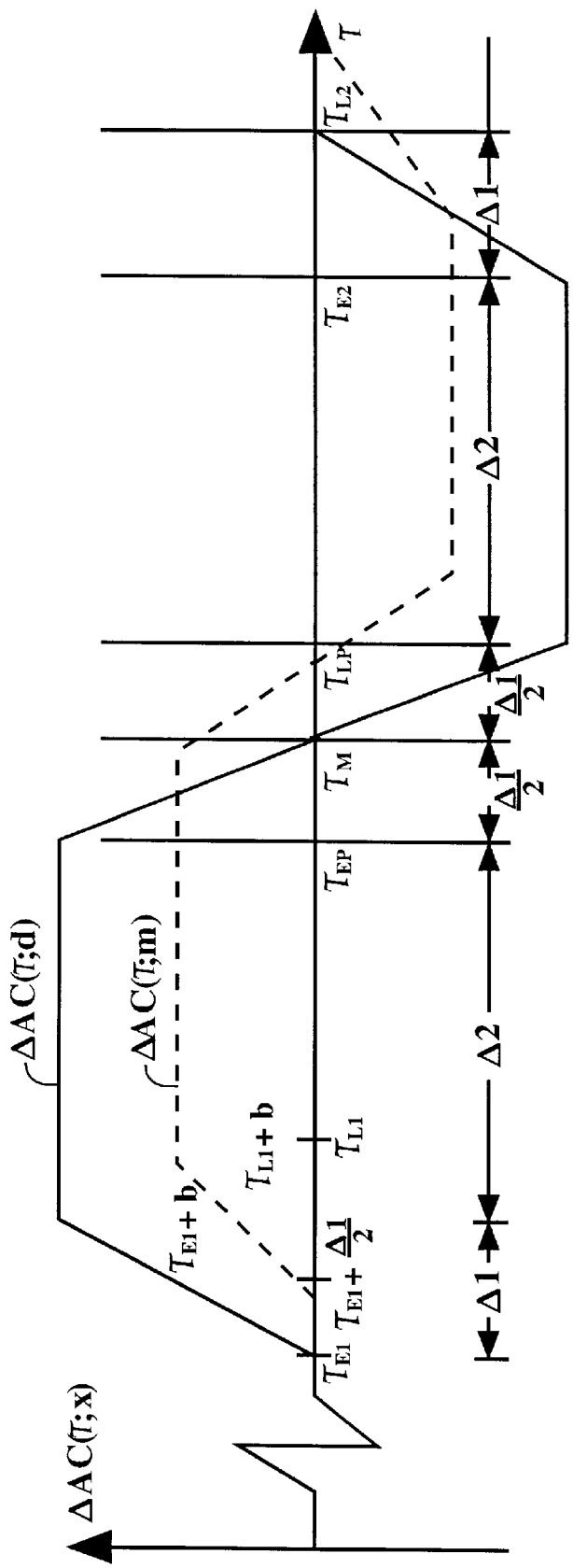
FIGS. 4A–4K are graphical views of the components $\Delta AC(\tau;d)=AC(\tau;d;E)-AC(\tau;d;L)$ and $\Delta AC(\tau;m)=\chi AC(\tau-b;d;E)-\chi AC(\tau-b;d;L)$ that would be computed from the signals $AC(\tau;d;x)$ and $\chi AC(\tau;d;x)$ shown in FIG. 3, depending upon the magnitude of the time delay b.

For values of $\tau$ satisfying $|\tau-\tau Ep|>\Delta\tau_{chip}$, the individual autocorrelation functions $AC(\tau;d)$ for $\tau>\Delta\tau_{chip}$ will have magnitudes less than V(min), and little useful information can be inferred from such measurements. The measurements of $AC(\tau-b;d)$ for $b>\Delta\tau_{chip}$ are of little interest here. For values of the time delay variable b satisfying $0\le b\le\Delta\tau_{chip}$, FIGS. 4A–4K illustrate the relationship between $\Delta AC(t;d)$ (solid line curve) and $\Delta AC(\tau;m)$ (broken line curve) for the following ranges of the time shift variable b:

FIG. 4A: $0\le b\le 0.5\Delta2;$ \quad (13A)

Figure 4B:
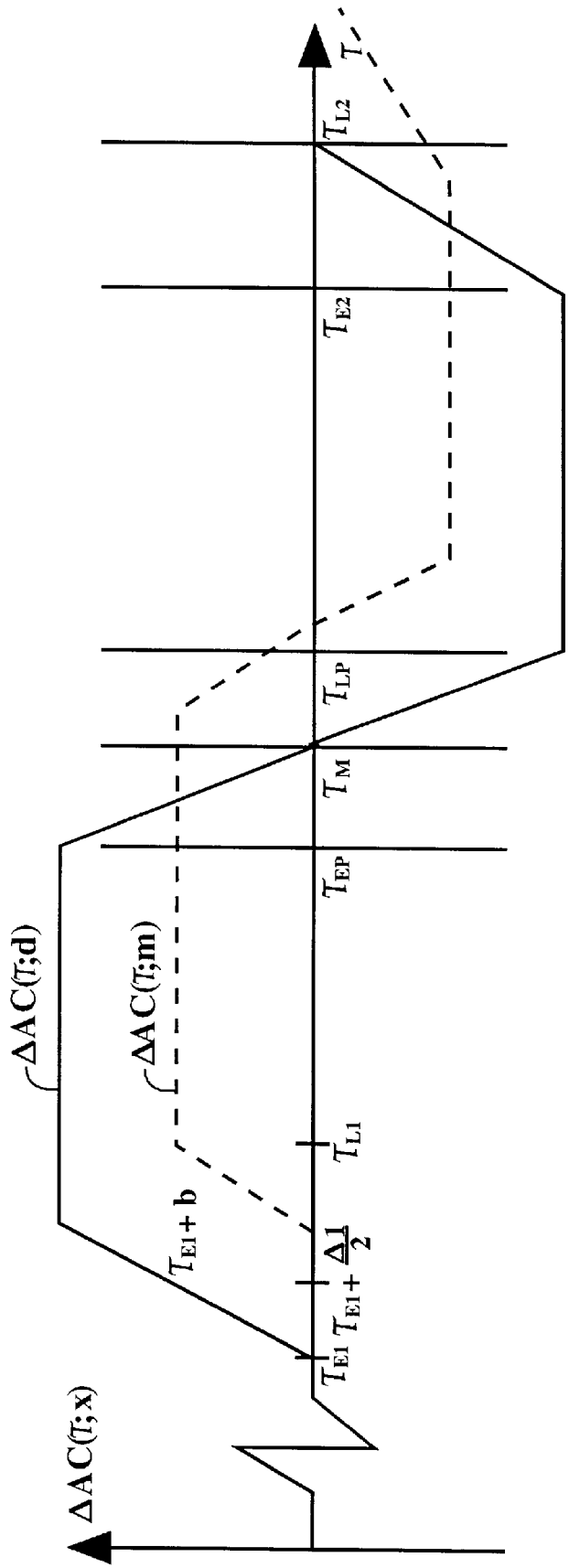

FIG. 4B: $0.5\Delta1 < b \leq \Delta1$; (13B)

Figure 4C:
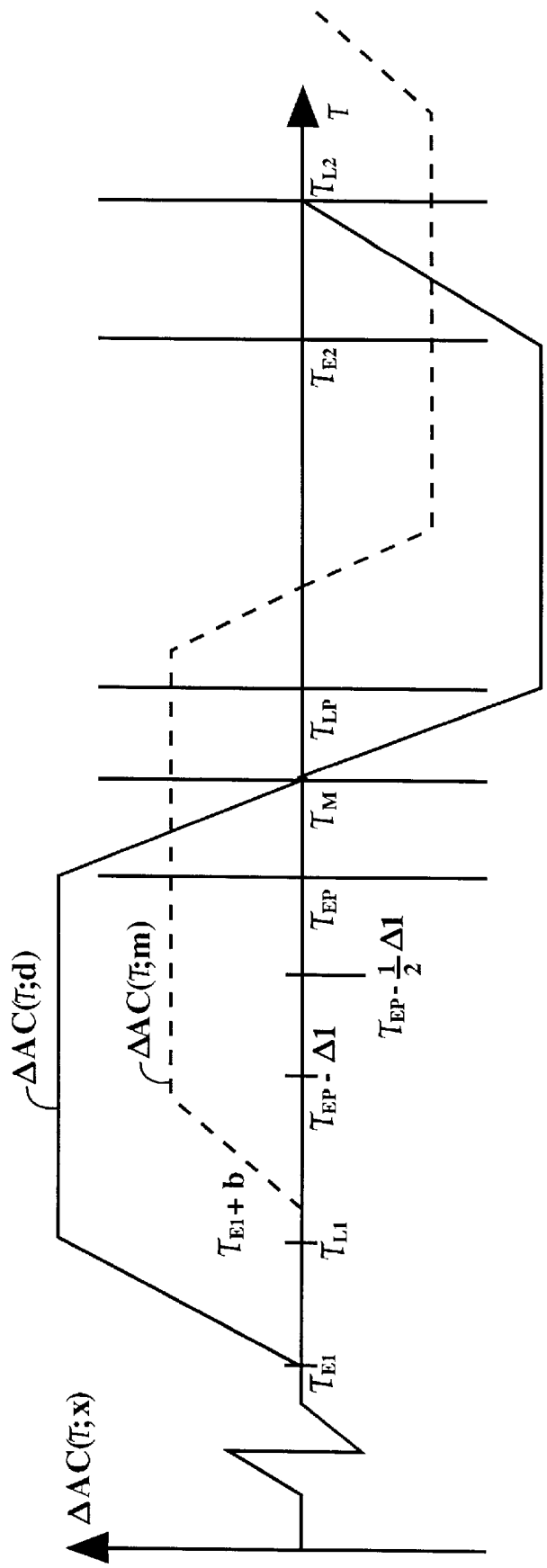

FIG. 4C: $\Delta1 < b \leq \Delta2 - \Delta1$; (13C)

Figure 4D:
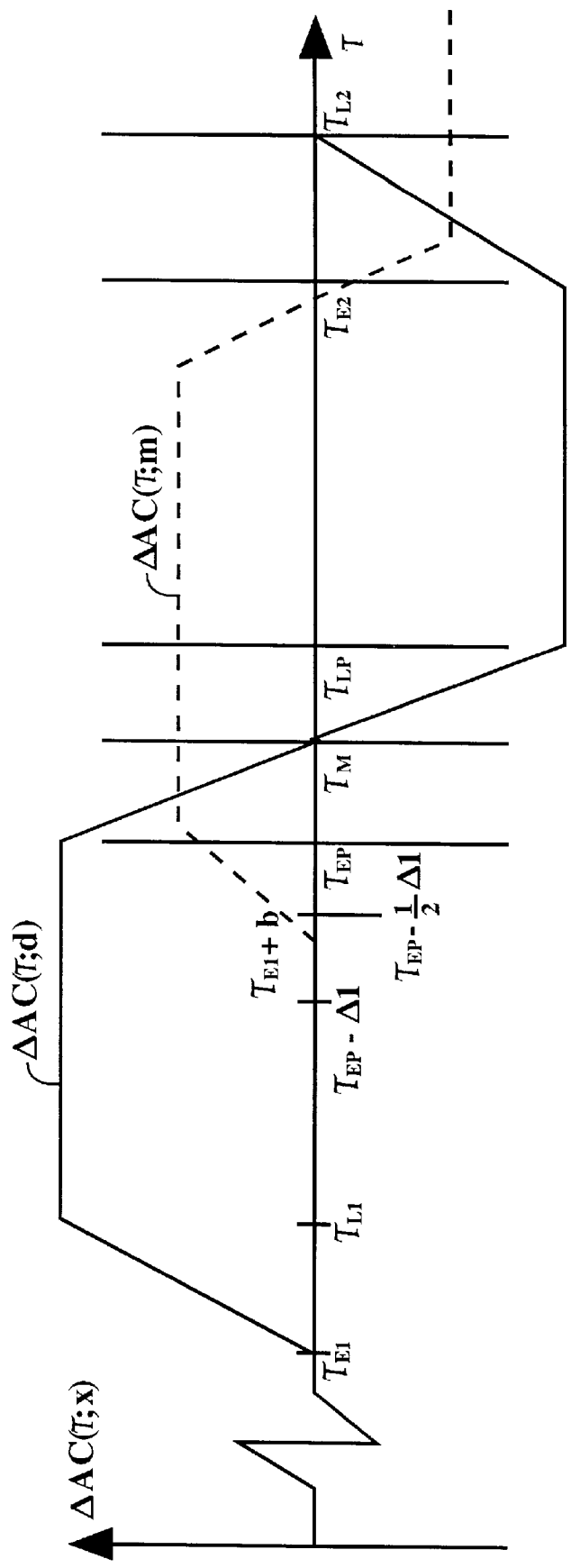

FIG. 4D: $\Delta2 - \Delta1 < b \leq \Delta2 - 0.5\Delta1$; (13D)

Figure 4E:
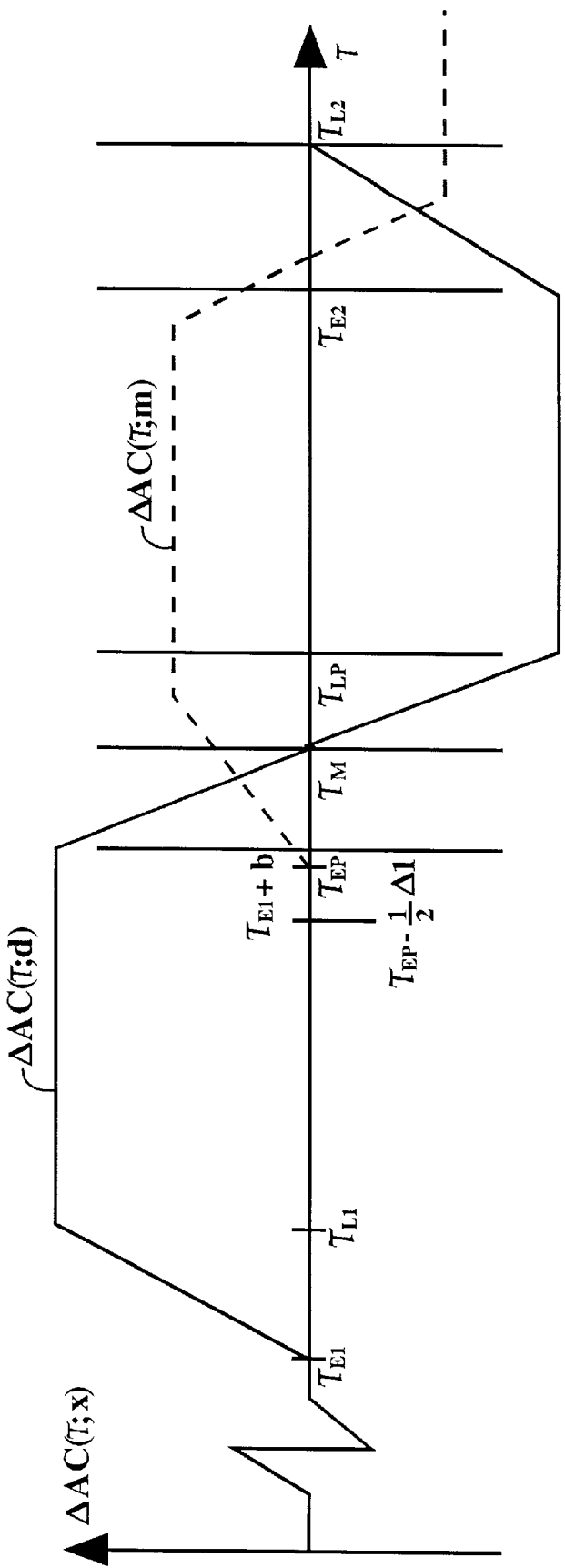

FIG. 4E: $\Delta2 - 0.5\Delta1 < b \leq \Delta2$; (13E)

Figure 4F:
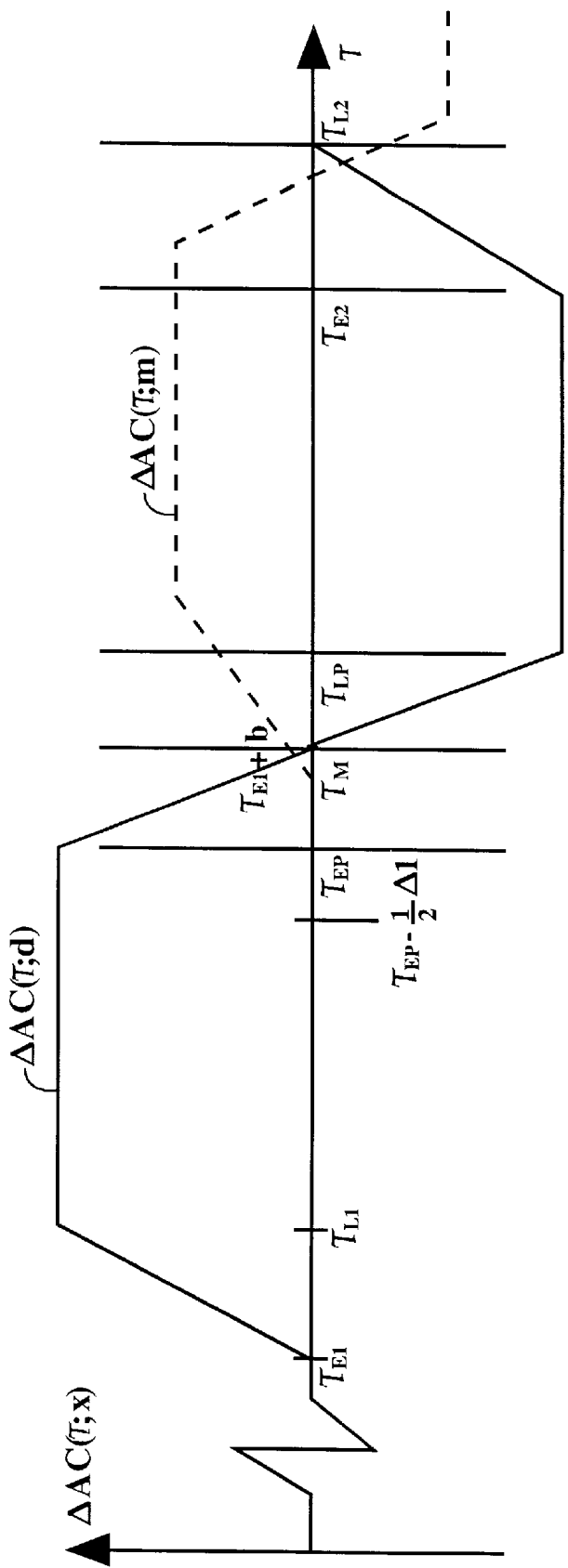

FIG. 4F: $\Delta2 < b \leq \Delta2 + 0.5\Delta1$; (13F)

Figure 4G:
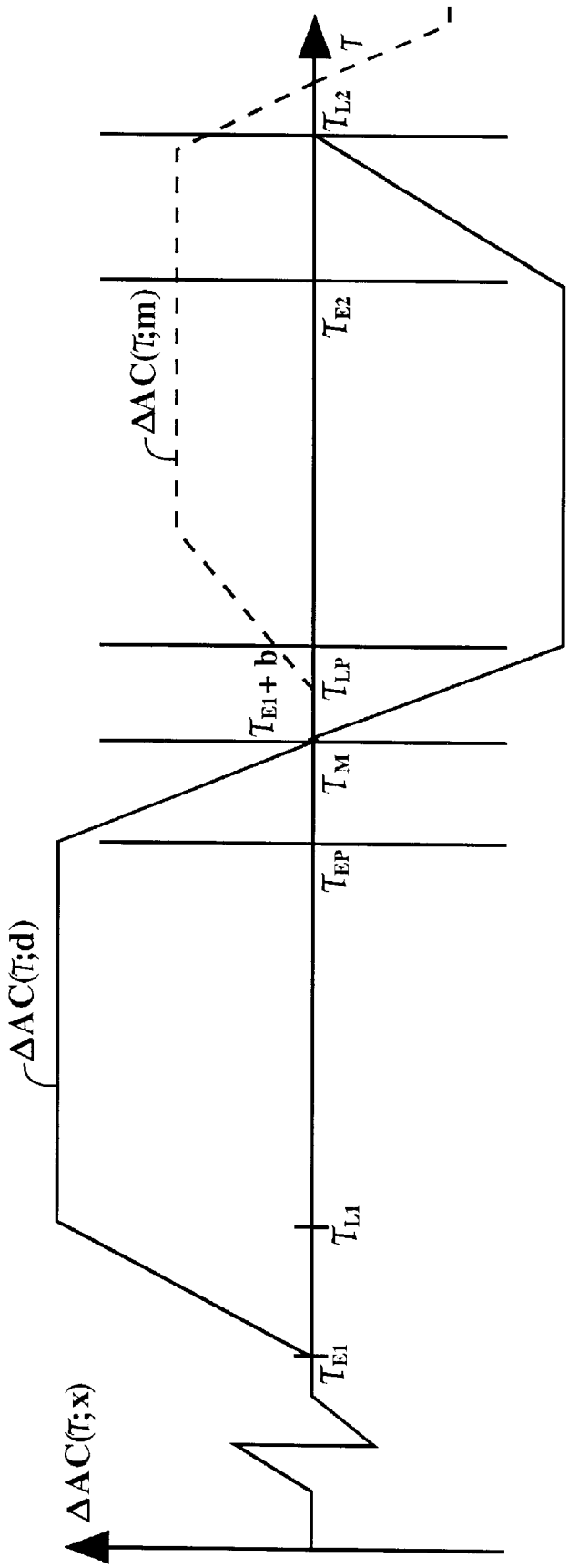

FIG. 4G: $\Delta2 + 0.5\Delta1 < b \leq \Delta2 + \Delta1$; (13G)

Figure 4H:
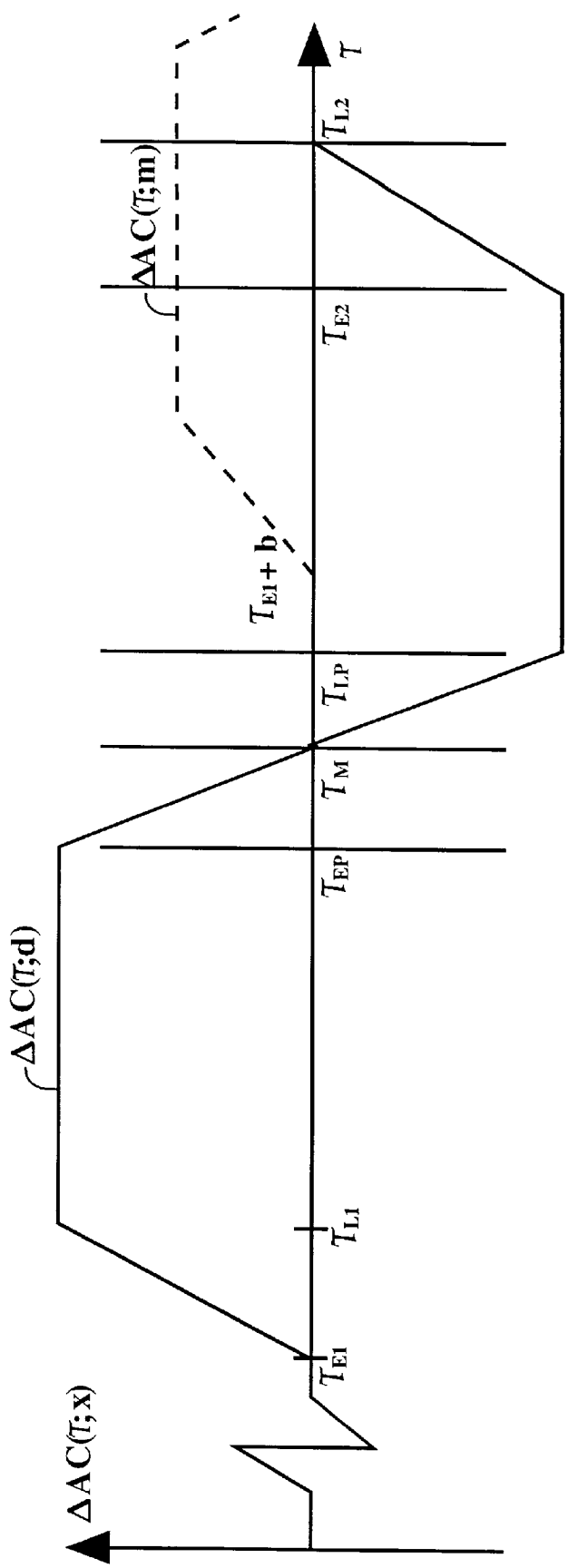

FIG. 4H: $\Delta2 + \Delta1 < b \leq 2\Delta2 - \Delta1$; (13H)

Figure 4I:
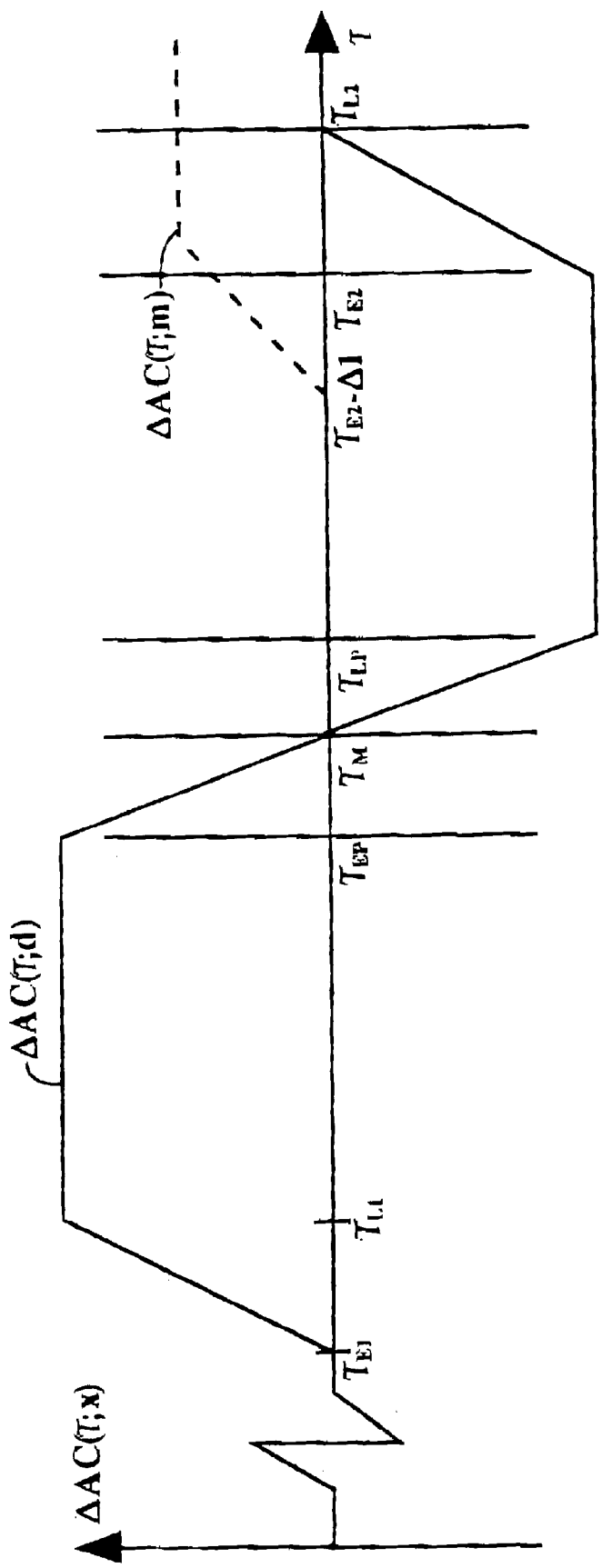

FIG. 4I: $2\Delta2 - \Delta1 < b \leq 2\Delta2 - 0.5\Delta1$; (13I)

Figure 4J:
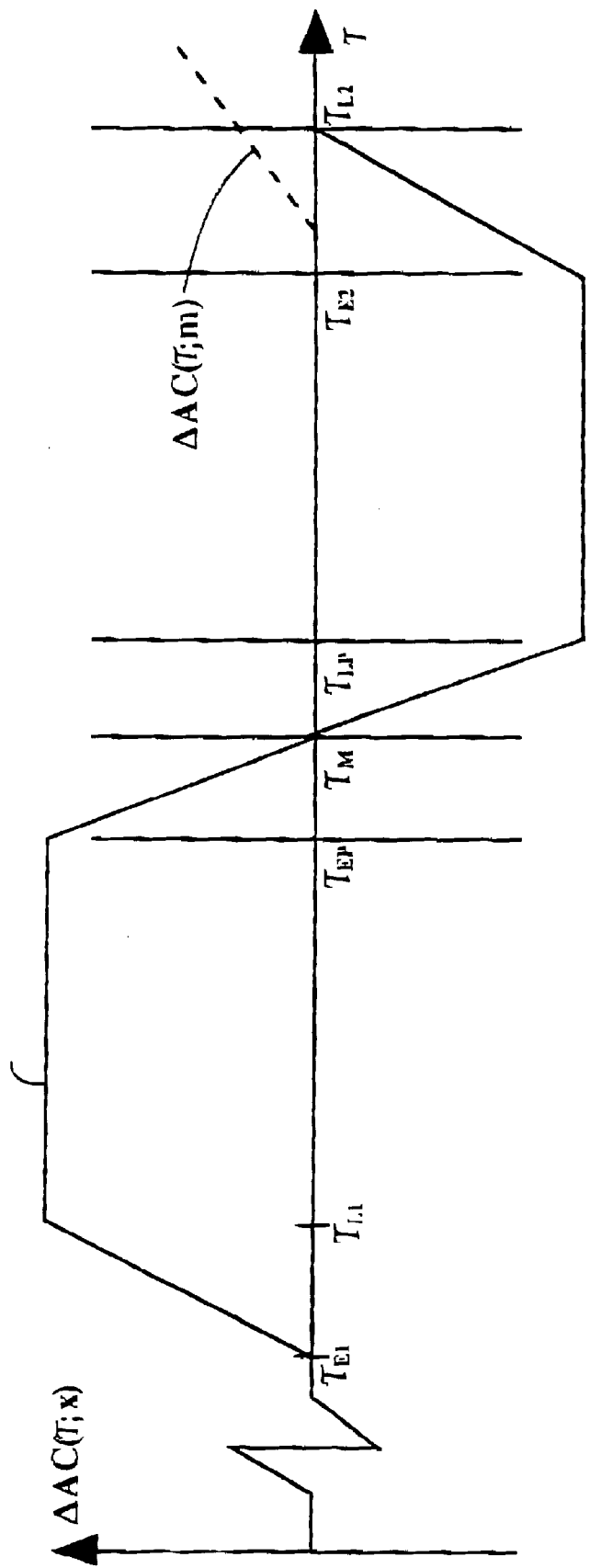

FIG. 4J: $2\Delta2 - 0.5\Delta1 < b \leq 2\Delta2$; (13J)

Figure 4K:
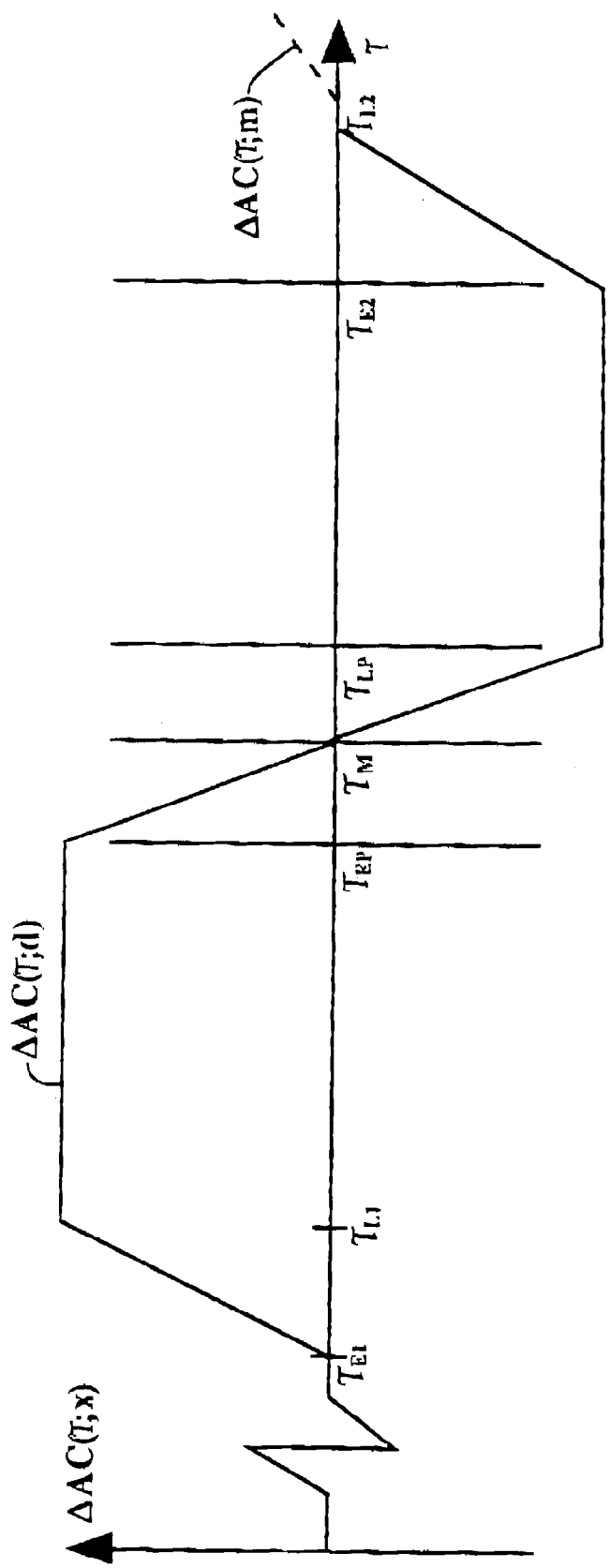

FIG. 4K: $2\Delta2 < b \leq 2\Delta2 + \Delta1$. (13K)

Figure 5:
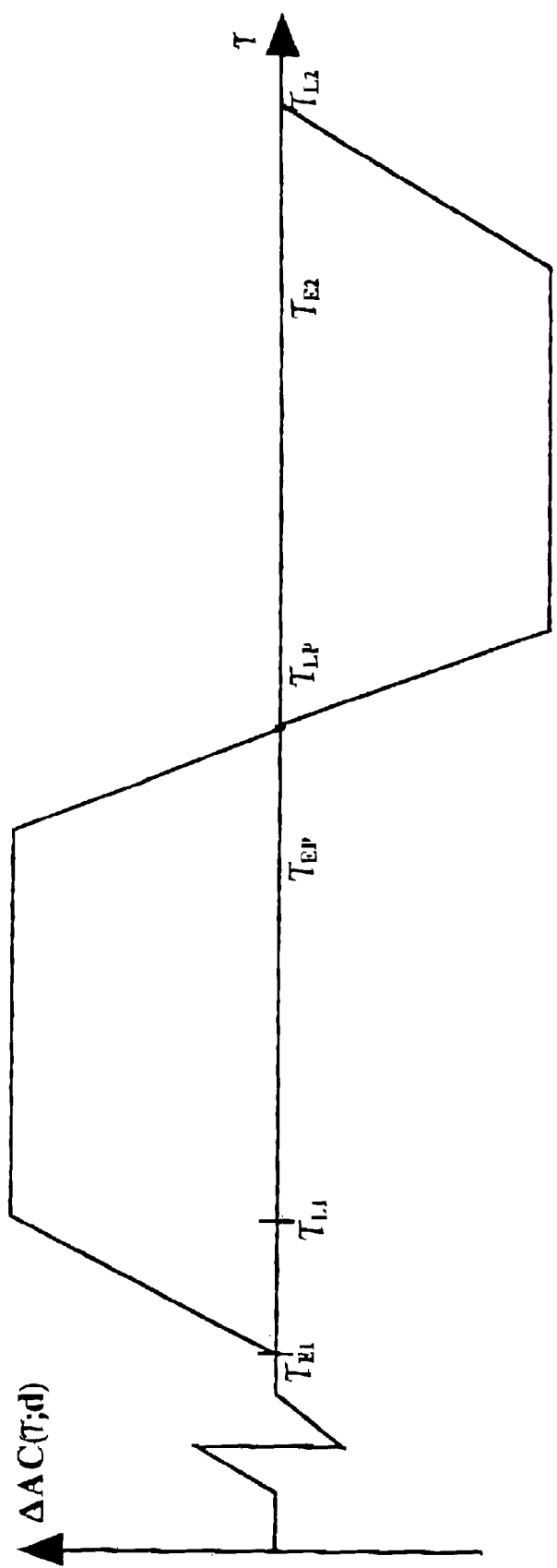
FIG. 5 is a graphical view of the known autocorrelation difference function $\Delta AC(\tau;d)$ for the direct signal only.
Figure 6C:
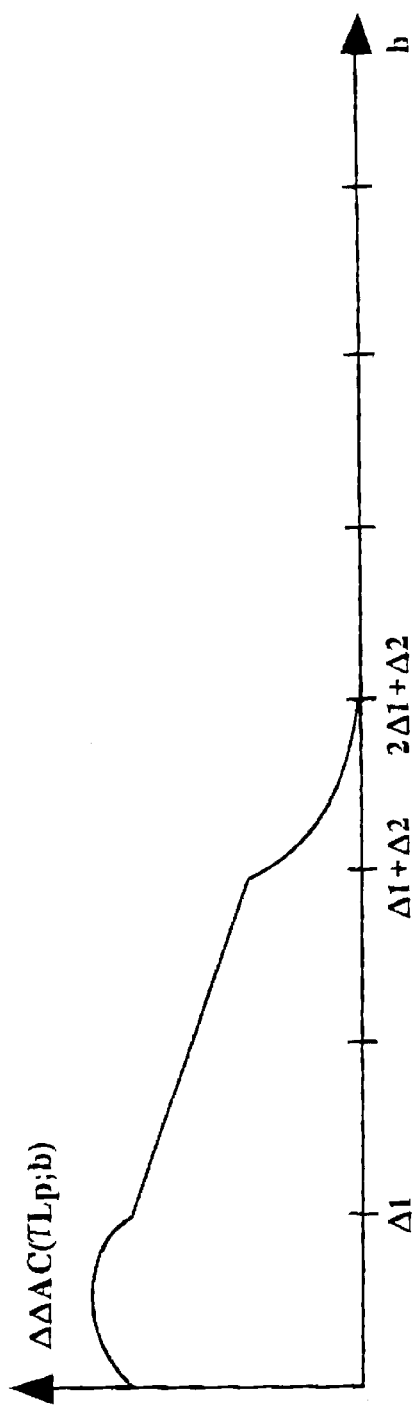
Figure 6D:
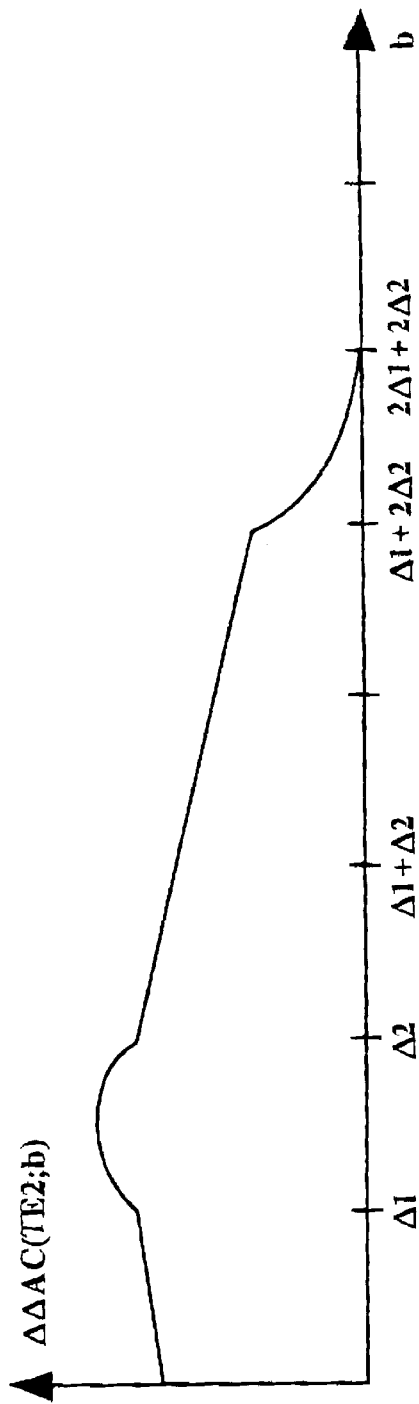
Figure 6E:
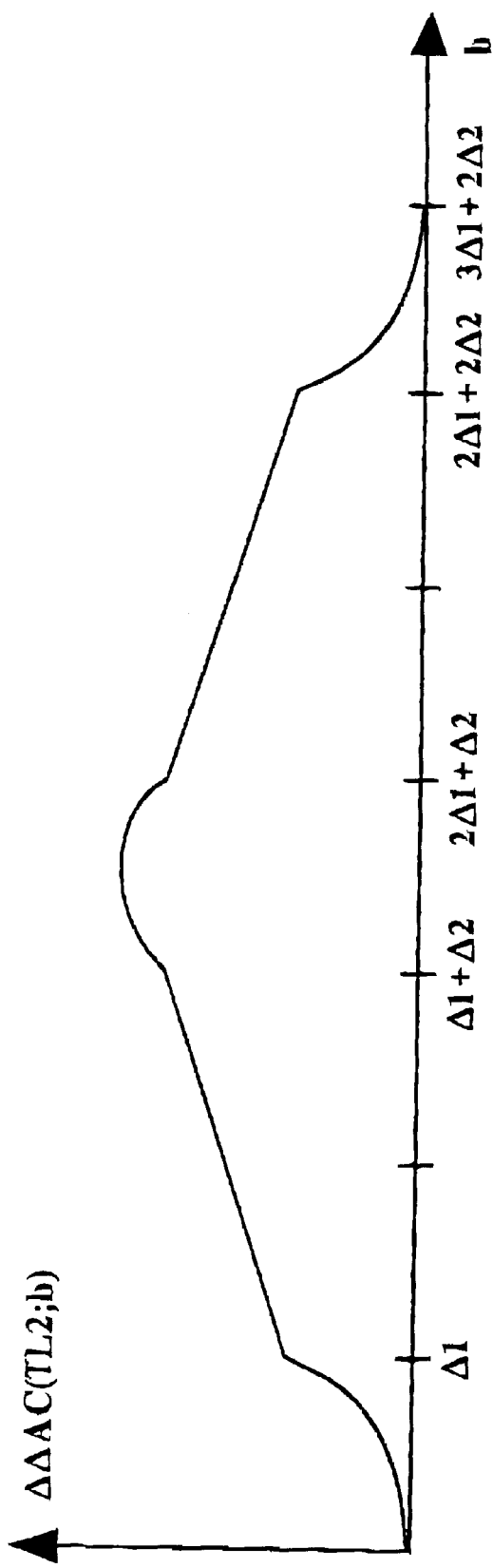

The direct signal autocorrelation difference function $\Delta AC(\tau;d)$ is known here, and is given by $$\begin{aligned}\Delta AC(\tau;d) &= a(\tau - \tau E1) & (\tau E1 \leq \tau \leq \tau L1) \\ &= a(\tau L1 - \tau E1) & (\tau L1 < \tau < \tau Ep) \\ &= a(\tau Ep + \tau Lp - 2\tau) & (\tau Ep < \tau \leq \tau Lp) \\ &= a(\tau E2 - \tau L2) & (\tau Lp < \tau \leq \tau E2) \\ &= a(\tau - \tau L2) & (\tau Ep < \tau \leq \tau L2)\end{aligned}$$ (14)

$$\Delta AC(\tau;\chi;b) = \chi \Delta AC(\tau - b;d)$$ (15)

and is illustrated in FIG. 5. A double difference autocorrelation function $$\Delta\Delta AC(\tau;\chi;b) = \Delta AC(\tau;\chi;b) - \Delta AC(\tau;d)$$ (16)

is now computed from the incoming composite signal measurements, and is integrated from a first selected value $\tau = \tau 0$, such as $\tau = \tau E1$ to a second selected value $\tau = \tau\hat{}$. This yields $$F(\tau\hat{};\chi;b) = \int_{\tau E1}^{\tau} \Delta\Delta AC(\tau';\chi;b)d\tau'/a$$ (17)

The integral function $F(\tau\hat{};\chi;b)$ is proportional to $\chi$ (unknown), varies with the integral endpoint $\tau\hat{}$, and must be defined separately for b in each of the 11 intervals indicated in Eqs. 13A–13K.

For the choices $\tau\hat{}=\tau Ep$, $\tau\hat{}=\tau=(\tau Ep+\tau Lp)2$, $\tau\hat{}=\tau Lp$, $\tau\hat{}=\tau E2$ and $\tau\hat{}=\tau L2$, the integral function $F(\tau\hat{};\chi;b)$ has the following values, depending upon the interval in which the time delay b lies.

$0 < b \leq 0.5\Delta1$:

$F(\tau Ep;\chi;b) = \chi a\Delta1(\Delta2 - 0.5\Delta1 - b)$, (18A)

$F(\tau M;\chi;b) = \chi a\{\Delta1(\Delta2-b)+(0.5\Delta1-b)^2\}$, (19A)

$F(\tau Lp;\chi;b) = \chi a\{\Delta1(\Delta2-b)+b^2-2(0.5\Delta1-b)^2\}$, (20A)

$F(\tau E2;\chi;b) = \chi a\{3b^2-b\Delta1+\Delta1^2-2(0.5\Delta1-b)^2\}$, (21A)

$F(\tau L2;\chi;b) = \chi ab^2$; (22A)

$0.5\Delta1 < b \leq \Delta1$:

$F(\tau Ep;\chi;b) = \chi a\Delta1(\Delta2 - 0.5\Delta1 - b)$, (18B)

$F(\tau M;\chi;b) = \chi a\Delta1(\Delta2-b)$, (19B)

$F(\tau Lp;\chi;b) = \chi a\{0.5\Delta1^2 + \Delta1\Delta2 - (\Delta1-b)^2\}$, (20B)

$F(\tau E2;\chi;b) = \chi ab\Delta1$, (21B)

$F(\tau L2;\chi;b) = 0.5\chi ab^2$; (22B)

$\Delta1 < b \leq \Delta2\Delta1$:

$F(\tau Ep;\chi;b) = \chi a\Delta1(\Delta2 - 0.5\Delta1 - b)$, (18C)

$F(\tau M;\chi;b) = \chi a\Delta1(\Delta2-b)$, (19C)

$F(\tau Lp;\chi;b) = \chi a\Delta1(\Delta2+0.5\Delta1-b)$, (20C)

$F(\tau E2;\chi;b) = \chi a\Delta1(0.5\Delta1+b)$, (21C)

$F(\tau L2;\chi;b) = \chi a\Delta1(-0.5\Delta1+b)$; (22C)

$\Delta2 - \Delta1 < b \leq \Delta2 - 0.5\Delta1$:

$F(\tau Ep;\chi;b) = 0.5\chi a(\Delta2-b)^2$, (18D)

$F(\tau M;\chi;b) = \chi a\Delta1(\Delta2-b)$, (19D)

$F(\tau Lp;\chi;b) = \chi a\Delta1(\Delta2+\Delta1-b)$, (20D)

$F(\tau E2;\chi;b) = \chi a\{\Delta1(\Delta2-0.25\Delta1)-(\Delta2-0.5\Delta1-b)^2\}$, (21D)

$F(\tau L2;\chi;b) = \chi a\Delta1 b$; (22D)

$\Delta2 - 0.5\Delta1 < b \leq \Delta2$:

$F(\tau Ep;\chi;b) = 0.5\chi a(\Delta2-b)^2$, (18E)

$F(\tau M;\chi;b) = \chi a\{1.5(\Delta2-b)^2+0.25\Delta1^2\}$, (19E)

$F(\tau Lp;\chi;b) = \chi a\Delta1(\Delta2+0.5\Delta1-b)$, (20E)

$F(\tau E2;\chi;b) = \chi a\{\Delta1(\Delta2-0.25\Delta1)-(b+0.5\Delta1-\Delta2)^2\}$, (21E)

$F(\tau L2;\chi;b) = \chi a\Delta1(b-0.5\Delta1)$; (22E)

$\Delta2 < b \leq \Delta2 + 0.5\Delta1$:

$F(\tau Ep;\chi;b) = 0$, (18F)

$F(\tau M;\chi;b) = 0.5\chi a(\Delta2+0.5\Delta1-b)^2$, (19F)

$F(\tau Lp;\chi;b) = \chi a\{(2+0.5\Delta1-b)^2+0.5\Delta1(2\Delta2+1.5\Delta1-2b)\}$, (20F)

$F(\tau E2;\chi;b) = \chi a\Delta1((2\Delta2-0.5\Delta1-b)$, (21F)

$F(\tau L2;\chi;b) = \chi a\{\Delta1(\Delta2-0.25\Delta1)-(\Delta2+0.5\Delta1-b)^2\}$; (22F)

$\Delta2 + 0.5\Delta1 < b \leq \Delta2 + \Delta1$:

$F(\tau Ep;\chi;b) = 0$, (18G)

$F(\tau M;\chi;b) = 0$, (19G)

$F(\tau Lp;\chi;b) = 0.5\chi a(\Delta1+\Delta2-b)^2$, (20G)

$F(\tau E2;\chi;b) = \chi a\Delta1(2\Delta2-0.5\Delta1-b)$, (21G)

$F(\tau L2;\chi;b) = \chi a\{\Delta1(\Delta2-0.25\Delta1)-(b-0.5\Delta1-\Delta2)^2\}$; (22G)

$\Delta2 + \Delta1 < b \leq 2\Delta2 - \Delta1$:

$F(\tau Ep;\chi;b) = 0$, (18H)

$F(\tau M;\chi;b) = 0$, (19H)

$F(\tau Lp;\chi;b) = 0$, (20H)

$F(\tau E2;\chi;b) = \chi a\Delta1(2\Delta2-0.5\Delta1-b)$, (21H)

$F(\tau L2;\chi;b) = \chi a1(2\Delta2+0.5\Delta1-b)$; (22H)

$2\Delta2 - \Delta1 < b \leq 2\Delta2 - 0.5\Delta1$:

$F(\tau Ep;\chi;b) = 0$, (18I)

$F(\tau M;\chi;b) = 0$, (19I)

$$F(\tau Lp;\chi;b)=0, \quad (20\text{I})$$

$$F(\tau E2;\chi;b)=0.5\chi a(2\Delta2-b)^2, \quad (21\text{I})$$

$$F(\tau L2;\chi;b)=\chi a\Delta1(2\Delta2+0.5\Delta1-b); \quad (22\text{I})$$

$2\Delta2-0.5\Delta1 < b \leq 2\Delta2$:

$$F(\tau Ep;\chi;b)=0, \quad (18\text{J})$$

$$F(\tau M;\chi;b)=0, \quad (19\text{J})$$

$$F(\tau Lp;\chi;b)=0, \quad (20\text{J})$$

$$F(\tau E2;\chi;b)=0.5\chi a(2\Delta2-b)^2, \quad (21\text{J})$$

$$F(\tau L2;\chi;b)=\chi a\Delta1(2\Delta2+0.5\Delta1-b); \quad (22\text{J})$$

$2\Delta2 < b \leq 2\Delta2+\Delta1$:

$$F(\tau Ep;\chi;b)=0, \quad (18\text{K})$$

$$F(\tau M;\chi;b)=0, \quad (19\text{K})$$

$$F(\tau Lp;\chi;b)=0, \quad (20\text{K})$$

$$F(\tau E2;\chi;b)=0, \quad (21\text{K})$$

$$F(\tau L2;\chi;b)=0.5\chi a(b-2\Delta2)^2. \quad (22\text{K})$$

The particular values used here for $\tau^\wedge$ in $F(\tau^\wedge;\chi;b)$ are arbitrary and are chosen for illustration. Any value of $\tau^\wedge$ in the range $\tau E1 < \tau^\wedge \leq \tau L2$ can be used here. For any value $\tau^\wedge$ chosen for the integration endpoint here, the quantity $F(\tau^\wedge;\chi;b)$ is a polynomial of degree at most two in the unknown time delay variable b and is proportional to $\chi$.

Recall that, with the exception of division of the difference integral in Eq. (15) by $\chi$, the quantities $F(\tau^\wedge;\chi;b)$ are computed from the integrals of differences of measurements of incoming signals. One now forms the ratio $$R(\tau1^\wedge;\tau2^\wedge;b)=F(\tau1^\wedge;\chi;b)/F(\tau2^\wedge;\chi;b) \quad (23)$$

which eliminates the quantity $\chi$ and allows one to compare a measured ratio $R(\tau1^\wedge;\tau2^\wedge;b)$ with the ratio of a first polynomial, $n(b)=n0+n1\,b+n2\,b^2$, in the numerator, divided by a second polynomial, $d0+d1\,b+d2\,b^2$, in the denominator. Here the coefficients nk and dk (k=0, 1, 2) are computable from the equations (18A)–(22K) or similar relations and from the selected quantities $\tau1^\wedge$ and $\tau2^\wedge$, but are independent of $\chi$ and b. Equation (23) can thus be rewritten as quadratic equation in b, viz.

$$(n0-d0R)+(n1-d1R)b+(n2-d2R)b^2=0, \quad (24)$$

where $R=R(\tau1^\wedge;\tau2^\wedge;b)$ is measured and computed from the incoming signal values. Equation (24) has two solutions, and at least one of these solutions should fall into one of the b-ranges indicated in Eqs. (13A)–(13J)

.
The computed quantities $F(\tau^\wedge;\chi;b)$, as a function of b, for $\tau^\wedge=\tau Ep$, $\tau^\wedge=\tau M$, $\tau^\wedge=\tau Lp$, $\tau^\wedge=\tau E2$ and $\tau^\wedge=\tau L2$ are shown schematically in FIGS. 6A–6E, respectively. Note that $F(\tau^\wedge;\chi;b)$ is monotonically decreasing for $\tau^\wedge=\tau Ep$ and $\tau^\wedge=\tau M$; this is also true for any value $\tau^\wedge < \tau M$. However, for $\tau^\wedge$ satisfying $\tau M < \tau^\wedge \leq \tau L2$, the function $F(\tau^\wedge;\chi;b)$ may be double-valued, being monotonically increasing in a first range $0 \leq b < b^\wedge$ and being monotonically, decreasing in a second range $b^\wedge < b < \Delta+2\Delta2$, where $b^\wedge$ is an intermediate value that depends upon the choice of $\tau^\wedge$ in the range $\tau M < \tau^\wedge \leq \tau L2$. Thus, for some purposes it may be preferable to select $\tau1^\wedge < \tau2^\wedge \leq tM$ in Eqs. (23) and (24).

After the value of the time delay variable b is determined, the quantity $$G(\tau3^\wedge;\tau4^\wedge;\chi;b)=\int_{\tau3^\wedge}^{\tau4^\wedge} \Delta\Delta AC(\tau';\chi;b)d\tau'/a \quad (25)$$

is measured and computed and compared with the computed positive quantity $$H(\tau3^\wedge;\tau4^\wedge;b)=\int_{\tau3^\wedge}^{\tau4^\wedge} \Delta AC(\tau'-b;d)d\tau'/a \quad (26)$$

where $\tau3^\wedge$ and $\tau4^\wedge$ are a selected pair of values satisfying $b \leq \tau3^\wedge < \tau4^\wedge \leq 3\Delta1+2\Delta2+b$. The attenuation or gain factor $\chi$ for the multipath signal is then determined by the ratio $$c=G(\tau3^\wedge;\tau4^\wedge;\chi;b)/H(\tau3^\wedge;\tau4^\wedge;b). \quad (27)$$

Many other approaches can also be used to determine the value of the attenuation or gain factor $\chi$. The computed quantity G in Eq. (25) is proportional to $\chi$, and the algebraic sign of G will determine the algebraic sign of $\chi$, and thus the polarity ($\pm1$) of the multipath signal $S_m(t;\chi;b)$ relative to the direct signal $S_d(t)$. The identified multipath signal $S_m(t;\chi;b)$ can then be subtracted from the composite signal s(t), viz.

$$s(t)-c\,S_d(t-b) \approx S_d(t) \quad (28)$$

to provide a more accurate estimate of the incoming direct signal and/or of the time of arrival t(arrival;d) of the desired direct signal $S_d(t)$.

The differences $\Delta\Delta AC(\tau',c;b)$ and $\Delta AC(\tau'-b;d)$ used in computing the quantities $G(\tau3^\wedge;\tau4^\wedge;\chi;b)$ in $H(\tau3^\wedge;\tau4^\wedge;b)$ in Eqs. (25) in (26) may use the time shift displacement $\tau_{LE}$ or may use any other time shift displacement value $\tau_{displ}$ that satisfies $0 < \tau_{displ} < \Delta\tau_{chip}$, as long as the same time shift displacement value is used for G and H.

An improved estimate of the time of arrival t(arrival;d) of the direct signal $S_d(t)$ can be used to estimate more accurately the distance from the signal transmitter to the receiver in a location determination (LD) system, where the location coordinates of the transmitter are known reasonably accurately as a function of time t. For example, in a Satellite Positioning System (SATPS), such as GPS or GLONASS, a plurality of satellite-based transmitters are placed in various orbits and the distances from two or more of these satellite transmitters are determined from the estimated propagation time of a known pseudo-random signal, or a frequency-differentiated signal, from the transmitter/signal source to the signal receiver, using equations set forth in Leick, op cit, pp. 249–253. In a ground-based positioning system, such as LORAN-C, Omega, Tacan, Decca, JTIDS Relnav and Position Location Reporting System (PLRS), the signal transmitters are located at fixed locations with known location coordinates on or near the ground. These location determination (LD) systems are discussed briefly in the following:

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55 degrees relative to the equator, and being separated from each other by multiples of 60 degrees longitude. The orbits have a radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK-modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code, and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90; the information from this material is incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8 degrees relative to the equator, and the three orbital planes are separated from each other by mulitples of 120 degrees longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.6022+9k/16) GHz and f2=(1.246=7k/16) GHz, where k (=0, 1, 2, . . . 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 60 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigational System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting Satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that comprise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably two or more) of SATPS satellites and passes these signals to an SATPS signal receiver/processor, which (1) identifies the SATPS satellite source for each SATPS signal, based upon the psuedo-random code incorporated in and/or the frequency used for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit.

Alternatively, the SATPS signals may be replaced by LORAN-C signals produced by two or more LORAN-C signal sources positioned at fixed, known locations, for location determination. A ground-based LORAN-C system relies upon a plurality of grand-based signal towers, preferably spaced apart 100–300 km. that transmit distinguishable, time-coded electromagnetic signals that are received and processed by a LORAN signal antenna and LORAN signal receiver/processor. A representative LORAN-C system is discussed in *LORAN-C User Handbook*, Department of Transportation, U.S. Coast Guard, Commandant Publication P16562.5, Nov. 18, 1992 (ISBN 0-16-041594-2), and by Magee et al in U.S. Pat. No. 3,665,086, which are incorporated by reference herein. If a time-coded message sequence is received from each of three LORAN transmitters, the relative time delays between these three messages can be used to determine the location of the signal receiver/processor with an estimated inaccuracy of the order of one hundred meters. One disadvantage of use of a LORAN system, vis-a-vis an SATPS location determination system, is that a large number of tall structures, with transmitters mounted thereon, may be needed to cover a given area with a LORAN system; whereas a relatively small number of SATPS satellites suffice for location determination using an SATPS configuration. Using a ground-based location determination system such as LORAN, a LORAN signal antenna and receiver/processor would replace the LDS signal antenna and receiver/processor in FIG. 1, with all other features remaining as before. LORAN-C signals use carrier frequencies of the order of 100 kHz and have maximum reception distances of the order of hundreds of kilometers.

Other ground-based radiowave signal systems that are suitable for use as part of an LDS include Omega, Decca, Tacan, JTIDS Relnav (U.S. Air Force Joint Tactical Information Distribution System) and PLRS (U.S. Army Position Location and Reporting System) and are summarized by Logsdon, op cit, pp. 6–7 and 35–40.

The combined use of FM subcarrier signals, as discussed by Kelley et al ini U.S. Pat. No. 5,173,710 (incorporated by reference herein), for location determination inside a building or similar structure plus satelite-based or ground-based LD signals for location determination, outside a building or similar structure, can also provide an LD system in most urban and suburban communities.

I claim:

1. A method for estimating the time of arrival of a multipath signal in a received composite signal, the method comprising the steps of:

receiving an incoming digital signal that contains a known reference signal;

combining the incoming signal with the reference signal to form a first mixed signal and computing from this first mixed signal a first autocorrelation function, which depends upon a selected time shift variable $\tau$, over a selected autocorrelation range;

combining the reference signal with itself to form a second mixed signal and computing from this second mixed signal a second autocorrelation function, which depends upon the selected time shift variable $\tau$, over the selected autocorrelation range;

forming a first autocorrelation difference function that is the difference between the first autocorrelation function, evaluated at a selected time shift value $\tau$, and the first autocorrelation function, evaluated at a difference between the selected time shift value $\tau$ and a selected time shift displacement;

forming a second autocorrelation difference function that is the difference between the second autocorrelation function, evaluated at the selected time shift value $\tau$, and the second autocorrelation function, evaluated at a difference between the selected time shift value $\tau$ and the selected time shift displacement;

forming a third autocorrelation difference function that is the difference between the first and second autocorrelation difference functions;

measuring a first integral or sum and a second integral or sum of the third autocorrelation difference function over a first selected range and over a second selected range, respectively, of values of the selected time shift variable $\tau$;

computing a first ratio of the first integral or sum divided by the second integral or sum;

determining a second ratio in which each of the numerator and the denominator is a polynomial of degree at most two, with selected polynomial coefficients, in a selected time delay variable b;

determining a solution b of a time delay equation resulting from equality of the first and second ratios; and when a solution b of the time delay equation is non-negative, interpreting the solution b as a time delay associated with a multipath signal that is present in the incoming signal.

2. The method of claim 1, further comprising the steps of:

forming a third ratio equal to said computed first integral or sum divided by a number that is proportional to said numerator of said second ratio, computed with said value of said time delay variable b equal to a solution b of said time delay equation; and interpreting the third ratio as an amplitude $\chi$ of said multipath signal present in said incoming signal, relative to the amplitude of said incoming signal.

3. The method of claim 2, further comprising the steps of:

computing a modified incoming signal, denoted s(t;mod), defined as $$s(t;\text{mod}) = s(t) - \chi S_d(t-b),$$

where s(t) denotes said incoming signal and $S_d(t)$ denotes said reference signal; and interpreting the modified incoming signal s(t;mod) as a result of removing a multipath signal from said incoming signal.

4. The method of claim 1, further comprising the steps of:

forming a third ratio equal to said computed second integral or sum divided by a number that is proportional to said denominator of said second ratio, computed with said value of said time delay variable b equal to a solution b of said time delay equation; and interpreting the third ratio as an amplitude $\chi$ of said multipath signal present in said incoming signal, relative to the amplitude of said incoming signal.

5. The method of claim 4, further comprising the steps of:

computing a modified incoming signal, denoted s(t;mod), defined as $$s(t;\text{mod}) = s(t) - \chi S_d(t-b),$$

where s(t) denotes said incoming signal and $S_d(t)$ denotes said reference signal; and interpreting the modified incoming signal s(t;mod) as a result of removing a multipath signal from said incoming signal.

6. The method of claim 1, further comprising the step of selecting said time delay equation to be of the form $$(n0-d0R)+(n1-d1R)b+(n2-d2R)b^2=0,$$

where R is said first ratio, $n0+n1\,b+n2\,b^2$ is said numerator for said second ratio and $d0+d1\,b+d2\,b^2$ is said denominator for said second ratio.

7. The method of claim 1, further comprising the step of drawing at least one of said first selected range and said second selected range from the class of ranges consisting of: $\tau 0 \leq \tau \leq \tau 0+\Delta 2$, $\tau 0 \leq \tau \leq \tau 0+\Delta 2+0.5\Delta 1$, $\tau 0 \leq \tau \leq \tau 0+\Delta 2+\Delta 1$, $\tau 0 \leq \tau \leq \tau 0+2\Delta 2$ and $\tau 0 \leq \tau \leq \tau 0+2\Delta 2+\Delta 1$, where $\Delta 1$ is said selected time shift displacement, $2\Delta 2$ is said selected autocorrelation range and $\tau 0$ is a selected value of said time shift variable $\tau$.

8. The method of claim 7, further comprising the step of selecting said quantities $\tau 0$ and $\Delta 2$ so that said second autocorrelation function, evaluated at said selected time shift value $\tau$, attains a local maximum value for $\tau=\tau 0+\Delta 2$.

9. The method of claim 7, further comprising the step of selecting said quantities $\tau 0$ and $\Delta 2$ so that said second autocorrelation function, evaluated at said time shift value $\tau$, is approximately zero for at least one of said time shift values $\tau=\tau 0$ and $\tau=\tau 0+2\Delta 2$.

10. The method of claim 7, further comprising the step of selecting one-half of said autocorrelation range, $\Delta 2$, to be approximately equal to a digital bit transition period for said reference signal.

11. The method of claim 7, further comprising the step of selecting said quantities $\Delta 1$ and $\Delta 2$ to satisfy $\Delta 1 \leq \Delta 2$.

12. Apparatus for estimating the time of arrival of a multipath signal in a received composite signal, the apparatus comprising:

a signal receiver, which communicates with a computer, for receiving an incoming digital signal that contains a known reference signal and for communicating the incoming signal to the computer, wherein the computer is programmed:

to receive the incoming signal from the signal receiver;

to combine the incoming signal with the reference signal to form a first mixed signal and to compute from this first mixed signal a first autocorrelation function, which depends upon a selected time shift variable $\tau$, over a selected autocorrelation range;

to combine the reference signal with itself to form a second mixed signal and to compute from this second mixed signal a second autocorrelation function, which depends upon the selected time shift variable A, over the selected autocorrelation range;

to form a first autocorrelation difference function that is the difference between the first autocorrelation function, evaluated at a selected time shift value $\tau$, and the first autocorrelation function, evaluated at a difference between the selected time shift value $\tau$ and a selected time shift displacement;

to form a second autocorrelation difference function that is the difference between the second autocorrelation function, evaluated at the selected time shift value $\tau$, and the second autocorrelation function, evaluated at a difference between the selected time shift value $\tau$ and the selected time shift displacement;

to form a third autocorrelation difference function that is the difference between the first and second autocorrelation difference functions;

to measure a first integral or sum and a second integral or sum of the third autocorrelation difference function over a first selected range and over a second selected range, respectively, of values of the selected time shift variable $\tau$;

to compute a first ratio of the first integral or sum divided by the second integral or sum;

to determine a second ratio in which each of the numerator and the denominator is a polynomial of degree at most two, with selected polynomial coefficients, in a selected time delay variable b;

to determine a solution b of a time delay equation resulting from equality of the first and second ratios; and when a solution b of the time delay equation is non-negative, to interpret the solution b as a time delay associated with a multipath signal that is present in the incoming signal.

13. The apparatus of claim 12, wherein said computer is further programmed:

to form a third ratio equal to said computed first integral or sum divided by a number that is proportional to said numerator of said second ratio, computed with said value of said time delay variable b equal to a solution b of said time delay equation; and to interpret the third ratio as an amplitude $\chi$ of said multipath signal present in said incoming signal, relative to the amplitude of said incoming signal.

14. The apparatus of claim 13, wherein said computer is further programmed:

to compute a modified incoming signal, denoted s(t;mod), defined as $$s(t;\text{mod}) = s(t) - \chi S_d(t-b),$$

where s(t) denotes said incoming signal and $S_d(t)$ denotes said reference signal; and to interpret the modified incoming signal s(t;mod) as a result of removing a multipath signal from said incoming signal.

15. The apparatus of claim 12, wherein said computer is further programmed:

to form a third ratio equal to said computed second integral or sum divided by a number that is proportional to said denominator of said second ratio, computed with said value of said time delay variable b equal to a solution b of said time delay equation; and to interpret the third ratio as an amplitude $\chi$ of said multipath signal present in said incoming signal, relative to the amplitude of said incoming signal.

16. The apparatus of claim 15, wherein said computer is further programmed:

to compute a modified incoming signal, denoted s(t;mod), defined as $$s(t;\text{mod}) = s(t) - \chi_c S_d(t-b),$$

where $s(t)$ denotes said incoming signal and $S_d(t)$ denotes said reference signal; and to interpret the modified incoming signal $s(t;\text{mod})$ as a result of removing a multipath signal from said incoming signal.

17. The apparatus of claim 12, wherein said time delay equation has the form $$(n0-d0R)+(n1-d1R)b+(n2-d2R)b^2=0,$$

where R is said first ratio, $n0+n1\ b+n2\ b^2$ is said numerator for said second ratio and $d0+d1\ b+d2\ b^2$ is said denominator for said second ratio.

18. The apparatus of claim 12, wherein at least one of said first selected range and said second selected range is drawn from the class of ranges consisting of: $\tau 0 \leq \tau \leq \tau 0+\Delta 2$, $\tau 0 \leq \tau \leq \tau 0+\Delta 2+0.5\Delta 1$, $\tau 0 \leq \tau \leq \tau 0+\Delta 2+\Delta 1$, $\tau 0 \leq \tau \leq \tau 0+2\Delta 2$ and $\tau 0 \leq \tau \leq \tau 0+2\Delta 2+\Delta 1$, where $\Delta 1$ is said selected time shift displacement, $2\Delta 2$ is said selected autocorrelation range and $\tau 0$ is a selected value of said time shift variable $\tau$.

19. The apparatus of claim 18, wherein said quantities $\tau 0$ and $\Delta 2$ are selected so that said second autocorrelation function, evaluated at said selected time shift value $\tau$, attains a local maximum value for $\tau=\tau 0+\Delta 2$.

20. The apparatus of claim 18, wherein said quantities $\tau 0$ and $\Delta 2$ are selected so that said second autocorrelation function, evaluated at said time shift value $\tau$, is approximately zero for at least one of said time shift values $\tau=\tau 0$ and $\tau=\tau 0+2\Delta 2$.

21. The apparatus of claim 18, wherein one-half of said autocorrelation range, $\Delta 2$, is selected to be approximately equal to a digital bit transition period for said reference signal.

22. The apparatus of claim 18, wherein said quantities $\Delta 1$ and $\Delta 2$ are selected to satisfy $\Delta 1 \leq \Delta 2$.

* * * * *